(12) United States Patent
Graf et al.

(10) Patent No.: US 9,017,171 B2
(45) Date of Patent: Apr. 28, 2015

(54) SYSTEMS AND METHODS FOR SOCIALLY MOTIVATED MULTIPLAYER GAMING

(71) Applicant: Epic Games, Inc., Cary, NC (US)

(72) Inventors: Joseph James Graf, Cary, NC (US); Donald George Mustard, Lehi, UT (US); Geremy Steele Mustard, Springville, UT (US)

(73) Assignee: Epic Games, Inc., Cary, NC (US)

( * ) Notice: Subject to any disclaimer, the term of this patent is extended or adjusted under 35 U.S.C. 154(b) by 71 days.

(21) Appl. No.: 13/837,513

(22) Filed: Mar. 15, 2013

(65) Prior Publication Data

US 2013/0260894 A1  Oct. 3, 2013

Related U.S. Application Data

(60) Provisional application No. 61/618,053, filed on Mar. 30, 2012, provisional application No. 61/618,024, filed on Mar. 30, 2012.

(51) Int. Cl.
| | |
|---|---|
| *G06F 17/00* | (2006.01) |
| *A63F 13/30* | (2014.01) |
| *A63F 13/35* | (2014.01) |
| *A63F 13/45* | (2014.01) |
| *A63F 13/795* | (2014.01) |
| *A63F 13/847* | (2014.01) |

(52) U.S. Cl.
CPC ............... *A63F 13/12* (2013.01); *A63F 13/35* (2013.01); *A63F 13/45* (2013.01); *A63F 13/795* (2013.01); *A63F 13/847* (2013.01)

(58) Field of Classification Search
CPC ............ H04N 21/812; H04N 7/17318; H04N 21/2187; H04N 21/25883; H04N 21/8456; H04N 21/854; H04N 21/25866; H04N 21/4312; H04N 21/4314; H04N 21/4758; H04N 21/4788; H04N 21/4882; G06F 17/2229; G06Q 30/02; G06Q 10/10; G06Q 10/06; G06Q 10/107; G06Q 10/30; G06Q 20/04; G06Q 20/102; G06Q 20/24; G06Q 30/0204; G06Q 30/04; G06Q 30/0631; G06Q 30/0635; G06Q 40/06; G07F 17/32; G07F 17/3244; G07F 17/3276; G07F 17/3267; G07F 17/3211; G07F 17/3239; G07F 17/3225; G07F 17/3227; G07F 17/3258; G07F 17/3265; G07F 17/3288; G07F 17/34; G07F 17/3209
See application file for complete search history.

(56) References Cited

U.S. PATENT DOCUMENTS

| | | | | |
|---|---|---|---|---|
| 5,083,800 A | * | 1/1992 | Lockton | ........................ 463/42 |
| 6,746,333 B1 | * | 6/2004 | Onda et al. | ...................... 463/43 |

(Continued)

*Primary Examiner* — Sunit Pandya
(74) *Attorney, Agent, or Firm* — Hunton & Williams LLP (57) ABSTRACT

Various exemplary embodiments engage the community as a whole to complete game play tasks. In doing so, a large scale cooperative play may be achieved without having large groups of people directly connected to each other. These embodiments use the social graph to bring indirectly connected individuals together virtually to act as a greater force to solve a communal game play task. By solving the game play tasks globally, the player feels a connectedness to the community and their efforts that are not seen by players acting in isolation. The various exemplary embodiments also rewards players based upon group participation including granting larger rewards for larger participation. Furthermore, these embodiments may have a location based component to it, so that players come together a specific location in order to complete the communal task and claim the communal, and potentially location specific, reward.

20 Claims, 5 Drawing Sheets

(56) References Cited

U.S. PATENT DOCUMENTS

| | | | |
|---|---|---|---|
| 2002/0119824 A1* | 8/2002 | Allen | 463/42 |
| 2004/0162125 A1* | 8/2004 | Tarlie | 463/3 |
| 2011/0065511 A1* | 3/2011 | Mahan et al. | 463/40 |
| 2011/0246576 A1* | 10/2011 | Green | 709/204 |
| 2011/0263333 A1* | 10/2011 | Dokei et al. | 463/42 |

* cited by examiner

SYSTEMS AND METHODS FOR SOCIALLY MOTIVATED MULTIPLAYER GAMING

CROSS-REFERENCE TO RELATED APPLICATIONS

This patent application claims priority to U.S. Provisional Patent Application No. 61/618,053, filed Mar. 30, 2012, entitled "Systems and Methods for Socially Motivated Multiplayer Gaming," to Joseph James Graf, Donald Mustard, and Geremy Mustard and U.S. Provisional Patent Application No. 61/618,024, filed Mar. 30, 2012, entitled "Systems and Methods for Video Game Participation Via Social Network Interactions," to Joseph James Graf and Geremy Mustard, the contents of which are incorporated herein in its entirety.

FIELD OF THE DISCLOSURE

Embodiments of the present invention relate to systems and methods for socially motivated multiplayer gaming.

BACKGROUND OF THE DISCLOSURE

Typically gamers participate in a game in isolation or in small groups without any impact on the gaming community as a whole. The gamers perform tasks in a game in order to progress to its ending. Other player's actions generally have no bearing upon each other's game state. For instance a million players might participate in a game mission, but they do so as a million individuals with a million individual outcomes. Some games and game modes allow for limited shared experiences but not on a global or game community wide scale. To truly have global game play impacts, the entire population of a game must be allowed to share in the progress and rewards of a game play task. These and other drawbacks exist.

SUMMARY OF THE DISCLOSURE

Various exemplary embodiments ask or engage the community as a whole to complete game play tasks. In doing so, large scale cooperative play is achieved without having large groups of people directly connected to each other. These embodiments use the social graph to bring indirectly connected individuals together virtually to act as a greater force to solve a communal game play task. By solving the game play tasks globally, the player feels a connectedness to the community and their efforts that are not seen by players acting in isolation. The various exemplary embodiments also reward players based upon group participation including granting larger rewards for larger participation. Furthermore, these embodiments may have a location based component to it, so that players must come together at a specific location (e.g., physical or virtual) in order to complete the communal task and claim the communal, and potentially location specific, reward.

BRIEF DESCRIPTION OF THE DRAWINGS

The present disclosure, together with further objects and advantages, may best be understood by reference to the following description taken in conjunction with the accompanying drawings, in the several Figures of which like reference numerals identify like elements, and in which.

DETAILED DESCRIPTION OF EXEMPLARY EMBODIMENT(S)

The following description is intended to convey a thorough understanding of the embodiments described by providing a number of specific embodiments and details involving systems and methods for providing socially motivated multiplayer gaming. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Various exemplary embodiments provide for socially motivated multiplayer gaming.

The following terms referred to herein may be understood as follows:

In various embodiments, the terms "game" or "client" may refer to the software product a person is using.

In various embodiments, the terms "gamer", "player", or "user" may refer to the individual that is interacting with the game.

In various embodiments, "game event author" may refer to the person or persons that decided the set of rules and goals for a social game event. These can be the actual game authors or individuals that play the game or automatically generated by a computer analyzing play patterns, for example.

In various embodiments, the terms "event," "game event," "game play event," or "challenge" may refer to the social goal that has been created by the game event author.

In various embodiments, the term "server" may refer to the networked computer or groups of computers that process the global game event state.

In various embodiments, the term "request" may refer to a message sent from on software and/or hardware component to another software and/or hardware component.

In various embodiments, the term "response" may refer to a message sent from on software and/or hardware component to another software and/or hardware component.

In various embodiments, the phrase "server updates" may refer to the persistent or temporary modification of the game event's data.

A system and method may include various exemplary embodiments for socially motivated multiplayer gaming. The system and method may include at least one gaming system and a plurality of gamer systems that may communicate with one another over a network. The system and method may further include development and creation of a gaming event at the gaming system. For example, the system and method may include participation in a social gaming event via a gamer system. Additionally, the system and method may include the processing of social game event data, including, for example, the beginning of a game event, posting of a game event to a social graph, sending and receiving of event related messages, sending and receiving of event completion data including, for example successful attempts and goal progress as well as non-success-related data. Other forms of gamer interaction, game creation, and/or game processing may also be considered in accordance with the various embodiments of the present invention.

Figure 1:
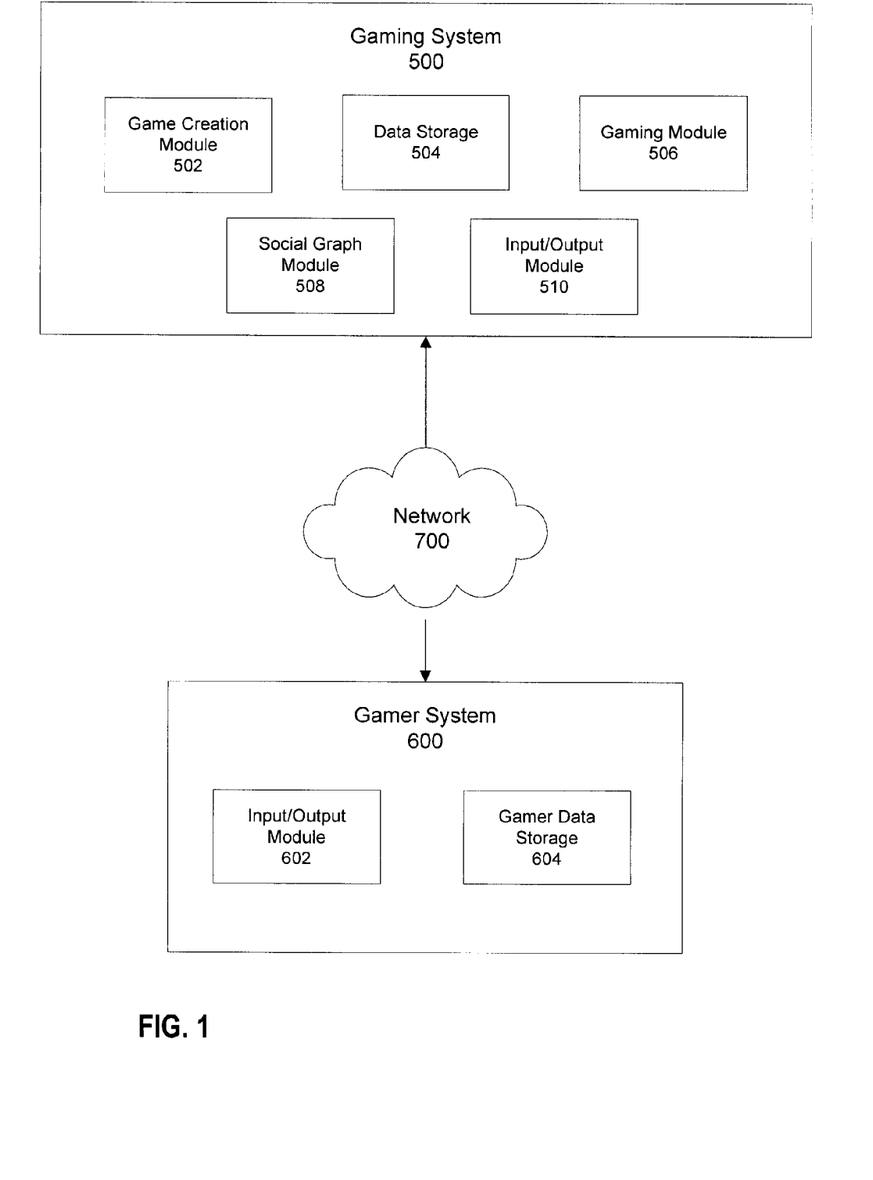
FIG. 1 is a block diagram of hardware components of socially motivated multiplayer gaming according to a particular embodiment.

FIG. 1 illustrates a block diagram of hardware components of socially motivated multiplayer gaming according to a particular embodiment. The system for socially motivated multiplayer gaming may include a gaming system 500 and a gamer system 600.

The gaming system 500 and gamer system 600 may each include a network-enabled computer system and/or devices. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, a game server, a gaming console, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable social gameplay, as described herein.

The gaming system 500 and gamer system 600 may be coupled via one or more networks, such as, for example, network 700. Network 700 may be one or more of a wireless network, a wired network or any combination of wireless network and wired network. For example, network 700 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 700 may include, without limitation, telephone lines, fiber optics, IEEE Ethernet 902.3, a wide area network ("WAN"), a local area network ("LAN"), or a global network such as the Internet. Also network 700 may support an Internet network, a wireless communication network, a cellular network, or the like, or any combination thereof. Network 700 may further include one network, or any number of the exemplary types of networks mentioned above, operating as a stand-alone network or in cooperation with each other. Network 700 may utilize one or more protocols of one or more network elements to which they are communicatively coupled. Network 700 may translate to or from other protocols to one or more protocols of network devices. Although network 700 is depicted as a single network, it should be appreciated that according to one or more embodiments, network 700 may comprise a plurality of interconnected networks, such as, for example, the Internet, a service provider's network, a cable television network, corporate networks, and home networks.

The gaming system 500 and gamer system 600 may each include various modules of hardware and software components. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

The gaming system 500 may include a game creation module 502, a gaming module 506, a social graph module 508, and/or an input/output module 510. Additionally, gaming system 500 may include data storage 504. Gaming system 500 may include an input/output module 510 for sending and receiving data that may be used in a game creation module 502, a gaming module 506, and/or a social graph module 508. The input/output module 510 may include various hardware and software components, such as, for example, a repeater, a microwave antenna, a cellular tower, or another network access device capable of providing connectivity between to different network mediums. The input/output module 510 may be capable of sending or receiving signals via network 700. Moreover, the input/output module 510 may provide connectivity to one or more wired networks and may be capable of receiving signals on one medium such as a wired network and transmitting the received signals on a second medium such as a wireless network.

Game creation module 502 may contain hardware and software components to receive gaming event information and create a gaming event. Moreover, game creation module 502 may access data storage 504 for gaming templates to use in gaming event creation. Gaming module 506 may include hardware and software components to provide a gaming event for gamers using a gamer system 600. Gaming module 506 may include passive gaming events and active gaming events as well as success events and non-success events. A passive gaming event may include, for example, an event that is part of participation in a gaming event, but may be an event associated with a gamer in a gaming event. By way of example, passive gaming events may include gaming events associated with a social graph. A passive gamer may perform activities such as commenting on gaming events, providing social graph support for a gaming event (e.g., providing a like, a star, a heart, a high-five, a thumbs-up, or the like to an active gamer in the passive gamer's social graph), providing social graph publicity for a gaming event, or the like. An active gaming event may include an event performed by an active gamer. An active gamer may perform activities associated with the game event, such as playing a gaming event for a period of time, for a specific level, and/or until a certain event goal is reached. Active game event data and passive game event data may further be stored in data storage 504 in gaming system 500. Data storage 504 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, data storage 504 may be a database, such as an Oracle database, a Microsoft SQL Server database, a DB2 database, a MySQL database, a Sybase database, an object oriented database, a hierarchical database, a NoSQL type database, or other database. Data storage 504 may utilize flat file structures for storage of data.

Social graph module 508 may contain hardware and software components to connect a social network of gamers using gamer systems 600. For example, social graph module may maintain social networking capabilities and structures for gamers and the dyadic ties between the gamers. Social graph module 508 may include social publishing functionality, social networking functionality, sharing functionality, social support functionality, and other features of social networking systems. Additionally social graph module may import or export gamer data to various social networking systems such as those employed by Facebook, MySpace, Google+, LinkedIn, Twitter, Pinterest, etc.

Gamer system 600 may include a network-enabled computer system and/or devices including various modules such as a gamer data storage module 604 and an input/output module 602. The input/output module 602 contains various hardware and software components to allow gamer system 600 to interact with gaming system 500 over network 700. The input/output module 602 may include various hardware and software components, such as, for example, a repeater, a microwave antenna, a cellular tower, or another network access device capable of providing connectivity between to different network mediums. The input/output module 602 may be capable of sending or receiving signals via network 700. Moreover, the input/output module 602 may provide connectivity to one or more wired networks and may be capable of receiving signals on one medium such as a wired network and transmitting the received signals on a second medium such as a wireless network. Data storage 604 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, data storage 604 may be a database, such as an Oracle database, a Microsoft SQL Server database, a DB2 database, a MySQL database, a Sybase database, an object oriented database, a hierarchical database, or other database. Data storage 604 may utilize flat file structures for storage of data.

Figure 2:
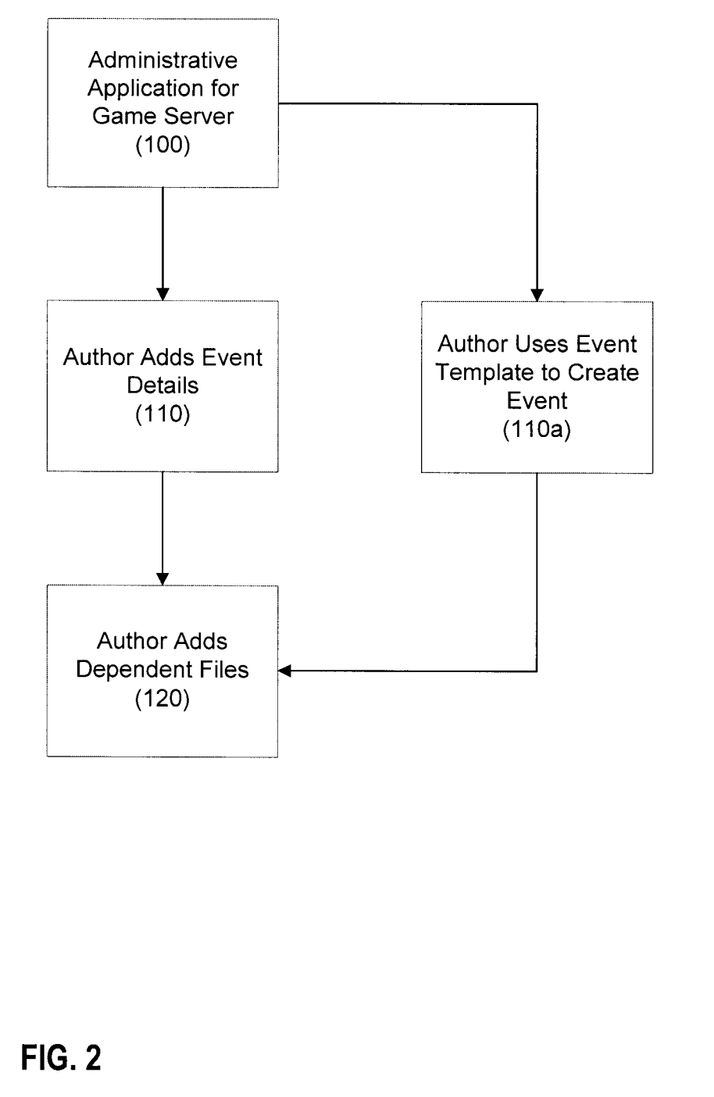
FIG. 2 is a flowchart illustrating socially motivated multiplayer game creation by a game event author according to a particular embodiment.

FIG. 2 illustrates a flowchart illustrating socially motivated multiplayer game creation by a game event author according to a particular embodiment. A gaming system 500 may be accessed via the World Wide Web, as seen in step 100. The author, which may be a gamer using gamer system 600, then in step 110 may specify a series of details, which may include one or more of the following: the global goal value for the event, the date and time it is first visible in the client, the date and time that the event opens for participation, the date and time that the event ends, the maximum number of times a single person can participate in it, the entry fee (if any) for participation, and other game specific values. Also, the authors may use a template from a previous event that contains setup data, which may be stored in and retrieved from data storage 504. When using this approach, as seen in step 110a, the date information may be calculated based upon relative dates to what the author enters, while determining the other dates via delta differences. Once the event has been created, the author may edit any of the values and/or add files to the event to be downloaded to the client, or gamer system 600. This is step 120.

Figure 3:
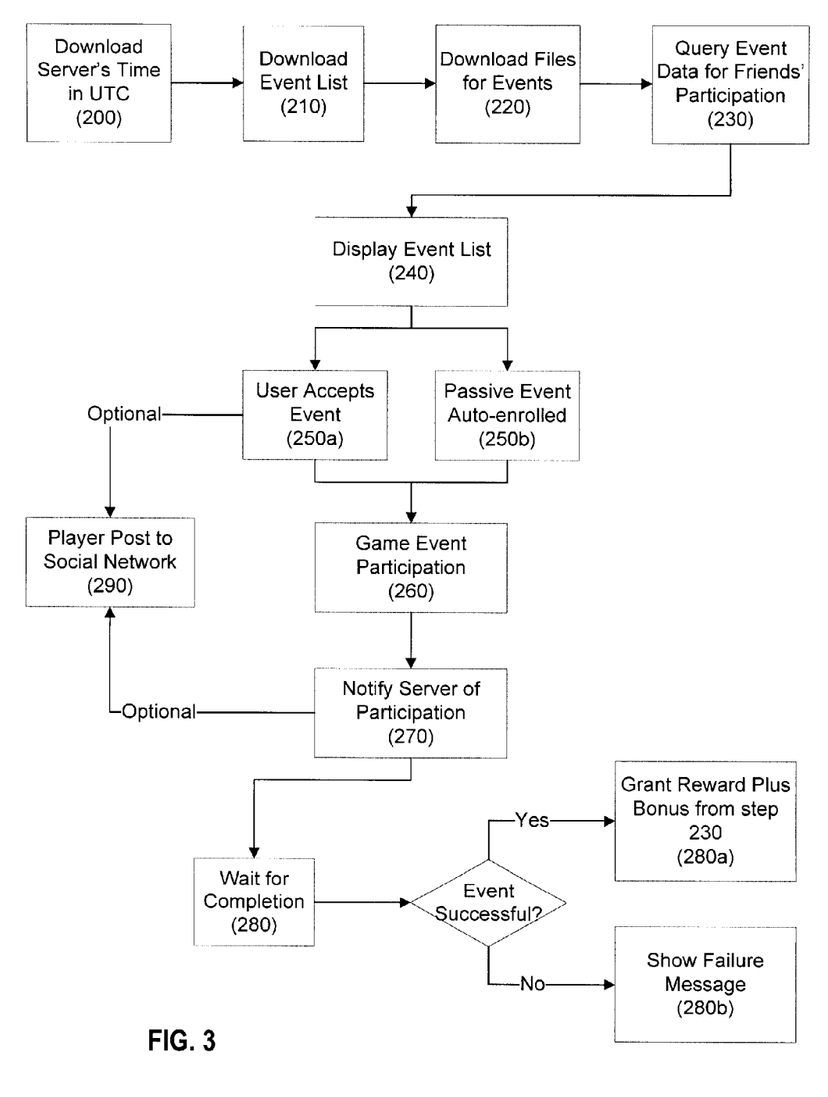
FIG. 3 is a flowchart illustrating a gamer as the gamer participates in a social game event according to a particular embodiment.

FIG. 3 is a flowchart illustrating a gamer as the gamer participates in a social game event according to a particular embodiment. The gamer system 600 may request the gaming system's 500 time information in UTC (step 200), which may be used to display relative time information about the event to the gamer via gaming system 600. Step 210 illustrates where a gamer system may request from the gaming system 500 the list of visible events for the gamer with their accompanying event state information. This list may be country or location specific depending on what the game event author has configured. Additionally, step 220 may include the downloading of files, images, and/or other types of game related content onto the gamer system 600. Optionally, in step 230, the gamer using a gamer system 600 may request information about the participation in that event by the gamer's friends using, for example social graph module 608 on the gaming system 500 to determine who (e.g., what active or passive gamer) to request that information for. The information for the event, including, but not limited to, start time and date, end time and date, the current progress of the event state, friend participation in the event, and game location (including any affiliated place of business at the game location) may be displayed to the gamer via a gamer system 600 for action by them (step 240). A start time and date and/or end time and date may be based on a number of achievements. For example, a start time may be when 1,000 gamers have reached a certain level, when 1,000 gamers like a post, or when there are 1,000 view of a video. Friend participation in the event may include data regarding whether or not the event is open to the public, open to a particular group of friends, or open to specific individual friends. Additionally, a participation fee may be displayed to the gamer. A participation fee may be real and/or virtual currency. Where a participation fee is presented, the gaming system 500 may determine whether the gamer system 600 has satisfied the participation fee before the gamer is allowed to accept participation.

The next step happens based upon whether this is an active event or passive event (steps 250a and 250b respectively). In the case of an active event, the gamer may accept participation in it (step 250a) via gamer system 600. At the point of acceptance, the gamer may optionally post a message to their social graph, by connecting to social graph module 508 of gaming system 500 indicating participation in the event (step 260). Passive events may not require explicit gamer initiation of participation in the event (step 250b). At this point the gamer may participate in the event by accessing the gaming module 506 of gaming system 500 (step 260). Where a participation fee is required, the participation fee may vary based on whether the participation is active or passive participation. Active participation in an event may also include a gamer, which may include a gamer system 600, be at a specific location, such as a particular place of business. Active participation may include location-based competitive game events so that various "locations" can compete against each other. For example, a Northeast team may be located in the northeastern states of the U.S. where a West Coast team may be located on the west coast of the U.S. Where participation is location-based, a gamer's location may be used to determine an overall winner for an event.

Figure 4:
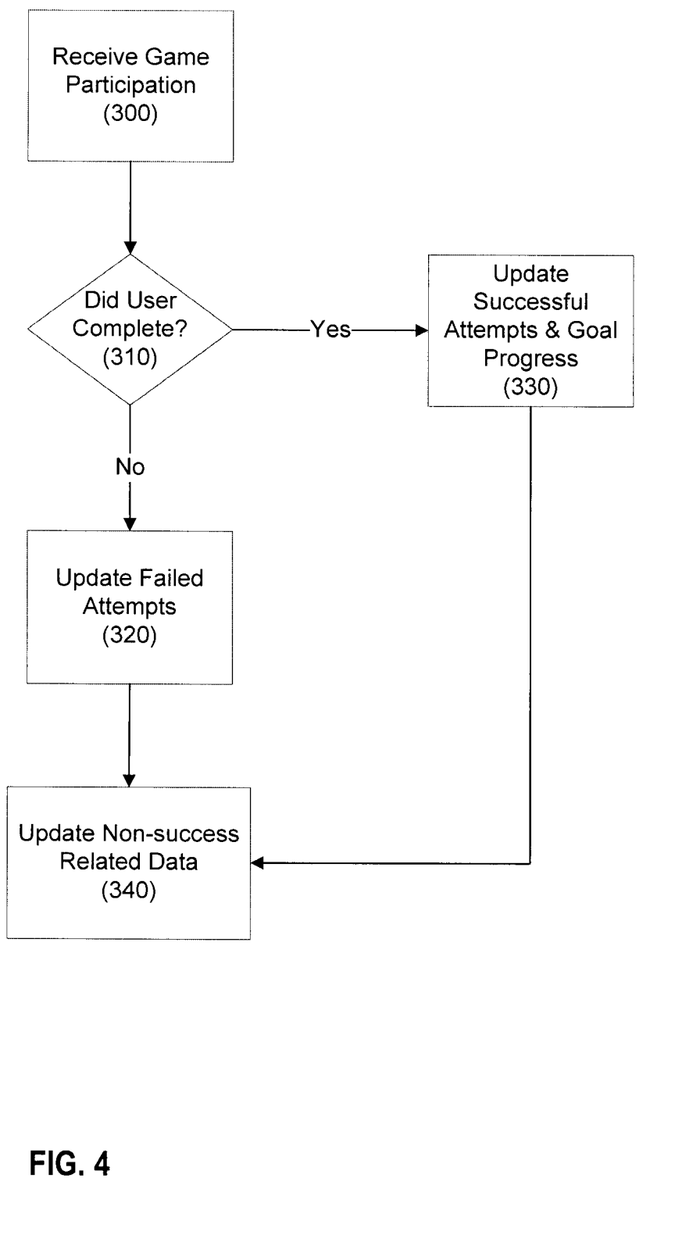
FIG. 4 is a flowchart illustrating an exemplary gaming system's processing of a player's game event progress according to a particular embodiment.

Upon completion of the event's game play by the gamer, whether successful or not, the gamer system 600 may notify the gaming system 500 where gamer progress may be stored, for example, to data storage 504 (step 270) (see FIG. 4 for server processing). The gamer may elect to post their completion information to their social graph by accessing social graph module 508 of gaming system 500 at step 290. The gaming module 506 may wait for asynchronous notification of the global event's completion (step 280). Upon notification of completion in step 280, the gaming module may check if the gaming event completed successfully or not.

Successful completion may be based on a goal value for the event. A goal value may be defined by the gamer system 600 or the gaming system 500. A goal value may be determined based a previous event goal or goals that were successfully attained by a gamer.

If the event was successfully completed, the gaming module 506 may grant the gamer a gamer event author configured reward (step 280a) and any bonuses or other awards for the friend participation that is referenced in step 230. A reward may be specific for the location or place of business where the game event took place. A reward may be selected from a tiered reward structure based on, for example gamer participation. A reward may be based on the number of participants, which may include active participants and/or passive participants. Moreover, there may be rules tied to a minimum reward and/or a maximum reward. These rules may be stored, for example, in data storage 504, where they may be accessed when gaming module 506 is determining a reward. A reward may also be based on the number of gamers simultaneously participating in an event, which may include active gamers and/or passive gamers. Moreover, a reward may be generated in a nested format, where there is one overall event with several sub-events. Each sub-event may provide a particular reward. Additionally, each reward for each sub-event may depend on whether the previous sub-event(s) were successfully completed and if so, each reward for each sub-event may also depend on if the previous sub-event(s) were successfully completed in a proper sequence. A reward may be a time-sensitive reward. For example, a reward may include unlocking an area of a game for a predetermined amount of time. If the event did not complete successfully, the gamer may be shown, via gamer system 600 an author configured message indicating the failure of the community to complete it (step 280b).

Gaming module 506 may also post event results, including reward results, in a leaderboard. Gaming module 506 may allow gamer system 600 to access the leaderboard and filter leaderboard results based on, for example, social graph connections maintained in social graph module 508, all participating users (active and passive), and only active participating users.

FIG. 4 is a flowchart illustrating an exemplary gaming system's processing of a player's game event progress according to a particular embodiment. In step 300, gaming system 500 may read event data sent from the gamer system 500. Gaming module 506 at gaming system 500 may analyze that data to determine if a gamer associated with gamer system 600 was successful in the event (step 310). If gaming module 506 determines the gamer was not successful, gaming module 506 may update information pertaining to the global statistics related to failure attempts of a gamer and store that information in data storage 504 (step 320). If gaming module 506 determines that a gamer is successful, gaming module 506 may update the global statistics for successful events and updates the global progress towards the completion of the event and store the global statistics and global progress in data storage 504 (step 330). Gaming module 506 may then update non-success related global statistics about the event in data storage 504 (step 340). Global progress may include unlocking specific areas of a game. For example, a particular level may be blocked off to gamers until a game event status is successfully completed.

The game event progress may further include game event progress including a plurality of sub-events in the overall game event. Where there are sub-events, the gaming module 506 may require that the gamer successfully complete a first sub-event before moving on to a second sub-event. The gaming module 506 may require that a first sub-event be completed while a gamer is in a top predefined percentage of gamers competing before a gamer may move on to a second sub-event. The gaming module 506 may also not require that a sub event be completed before moving on to the next sub-event, or may not require that all sub-events be completed in sequential order.

Figure 5:
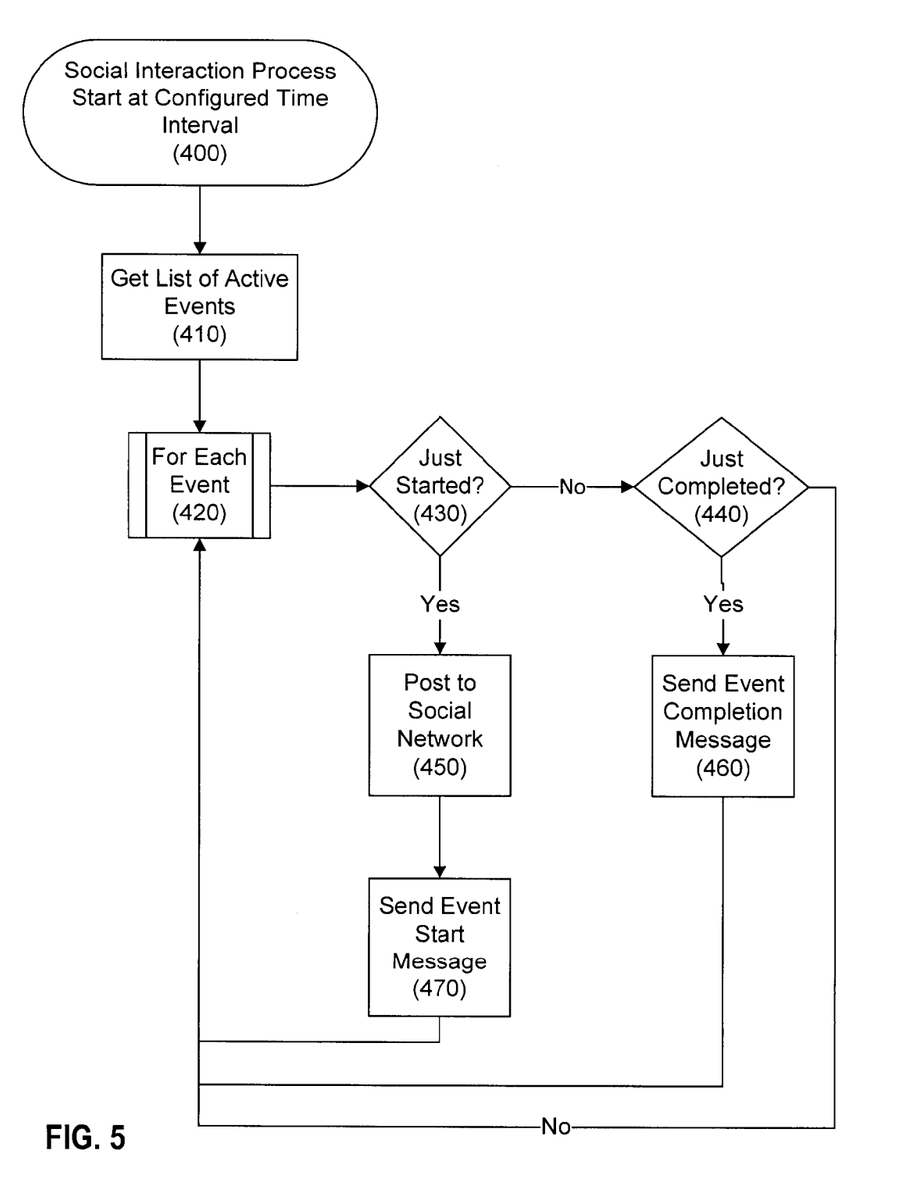
FIG. 5 is a flowchart illustrating a server's asynchronous processing of a game play event according to a particular embodiment.

FIG. 5 is a flowchart illustrating a server's asynchronous processing of a game play event according to a particular embodiment. The processing may be performed at a configurable time interval (step 400). At step 410, gaming module 506 at gaming system 500 may gather one or more active social game events with a snapshot of each event current state information from data storage 504. At step 420, a list of active events may be iterated through in gaming module 506, where each event may be processed in the integration as described below. At step 430, gaming module 506 may check the starting status for the event. If gaming module 506 determines that an event has just started, gaming module 506 may optionally post a message to at least one social graph associated with a gamer involved in the event via the social graph module 508 (step 450). Gaming module 506 may also notify registered gamers at each of the gamer's respecting gamer system 600 (step 470). Gaming module 506 may also test to see if goals for an event have been met by the global game community of gamers or if the community failed to meet the goals before a time limit expired (step 440). If gaming module 506 determines that a goal for an event has not been met and there is still time remaining in the event, gaming module may move to the next active event. Otherwise, gaming module 506 may use event configuration data from data storage 504 to send a notification of the completion of the event to all participating gamers (step 460). A notification may be queued for asynchronous delivery or may be delivered instantaneously. The notification may be delivered to a gamer system 600 through a variety of mechanisms, including, but not limited to, mobile push notifications, email messages, or SMS (short message service) messages. The notification may also be sent to the social graph module 508 for publishing to a gamer's social graph for more global awareness for gamers that did not participate in the event but actively play the game.

It is to be appreciated that the set of instructions, e.g., the software, that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

Accordingly, the embodiments of the present embodiments are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A method comprising:
   receiving, at a gaming system, gaming data including: a completion goal for at least one participating gamer in a gaming event, a date and time for when the gaming event is playable by the at least one gamer, and a date and time for when the gaming event is to be completed;
   determining, at the gaming system, a start status based on a comparison of a current time to the date and time for when the gaming event is playable;
   transmitting, via a social graph module, the gaming data at a predetermined start status, wherein the social graph module publishes gaming data and allows a non-participating gamer to interact with the transmitted gaming data and help the at least one participating gamer reach the completion goal;
   determining, at the gaming system, a goal status based on a comparison of participating gamer interaction and non-participating gamer interaction against the completion goal;
   determining, at the gaming system, a completion status based on a comparison of a current time to the date and time for the gaming event to be completed;
   transmitting, via a network to a gamer system, the goal status and the completion status; and
   determining a participating gamer reward based on the goal status and the completion status.

2. The method of claim 1, wherein the receiving gaming data further includes receiving at least one reward for the at least one participating gamer in the gaming event.

3. The method of claim 2, wherein the gaming system determines the reward status.

4. The method of claim 3 further comprising: transmitting the reward status to a social graph module.

5. The method of claim 3, wherein the gaming data further includes location data indicating a location at which a gaming event must be completed and the reward status is further based on the location data.

6. The method of claim 3, wherein the reward status is further based on a tiered reward structure, the tiered reward structure being based on a number of participating gamers.

7. The method of claim 1 further comprising: calculating, at a gaming system, at least one of: a success rate and a failure rate, for the at least one participating gamer and storing, at the gaming system, at least one of: the success rate and the failure rate.

8. The method of claim 1 further comprising: transmitting, to a gamer system, a notification alert based on at least one of: the start status indicating the date and time for when the gaming event is playable is met, or both the goal status indicating the completion goal for the at least one participating gamer is not met and the completion status indicating the date and time of the gaming event is to be completed will be met in less than a predefined time period.

9. The method of claim 1, wherein the gaming data is based on a set of gaming template data.

10. A system comprising:
    a gaming system configured to:
       receive gaming data including: a completion goal for at least one participating gamer in a gaming event, a date and time for when the gaming event is playable by the at least one gamer, and a date and time for when the gaming event is to be completed;
       determine a start status based on a comparison of a current time against the date and time for when the gaming event is playable;
       transmit, via a social graph module, the gaming data at a predetermined start status, wherein the social graph module publishes gaming data and allows a non-participating gamer to interact with the transmitted gaming data and help the at least one participating gamer reach the completion goal;
       determine a goal status based on a comparison of participating gamer interaction and non-participating gamer interaction against the completion goal for the at least one participating gamer;
       determine a completion status based on a comparison of a current time to the date and time for the gaming event to be completed;
       transmit the goal status and the completion status;
       determine a participating gamer reward based on the goal status and the completion status; and
    a data storage unit connectively coupled to the gaming system, the data storage unit configured to store the gaming data, the start status, the goal status, and the completion status.

11. The system of claim 10, wherein the gaming system is further configured to receive at least one reward for the at least one participating gamer in the gaming event.

12. The system of claim 11, wherein the gaming system is further configured to transmit the reward status.

13. The system of claim 12, wherein the gaming system is further configured to transmit the reward status to a social graph module.

14. The system of claim 12, wherein the goal status is based upon the number of connections in a social graph associated with the at least one participating gamer.

15. The system of claim 10, wherein the gaming system is further configured to calculate at least one of: a success rate or a failure rate, for the at least one participating gamer, and wherein the data storage unit is further configured to store at least one of: the success rate and the failure rate.

16. The system of claim 10, wherein the gaming system is further configured to transmit a notification alert based on at least one of: the start status indicating the date and time for when the gaming event is playable is met or both the goal status indicating the completion goal for the at least one participating gamer is not met and the completion status indicating the date and time for then the gaming event is to be completed will be met in less than a predefined time period.

17. The system of claim 10, wherein the gaming data is based on a set of gaming template data.

18. The system of claim 10 further comprising a gamer system configured to receive the goal status and the completion status and interact with the gaming system to participate in the gaming event.

19. The system of claim 18 wherein the gamer system is a passive gamer system and participating in the gaming event includes at least one of: commenting on a gaming event, providing social graph support for a gaming even, and providing social graph publicity for a gaming event.

20. The system of claim 10, wherein the gaming data further includes a geographic location at which a gaming event must be completed.

* * * * *